May 11, 1948.  A. C. MULDER  2,441,438
PORTABLE MANUAL ELECTRIC SPOT WELDER
Filed March 16, 1948   2 Sheets-Sheet 1
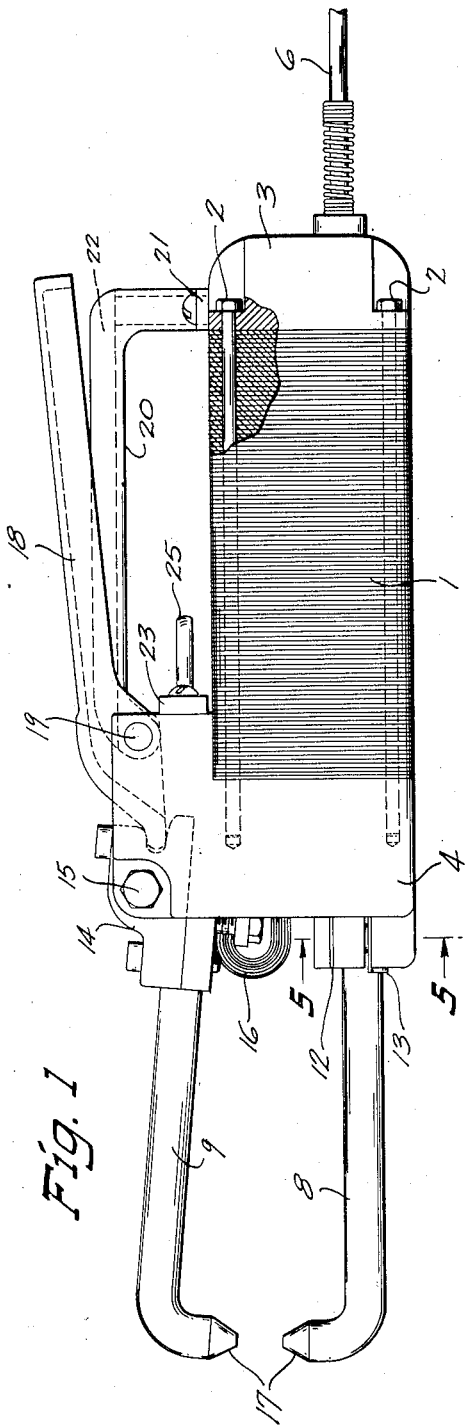
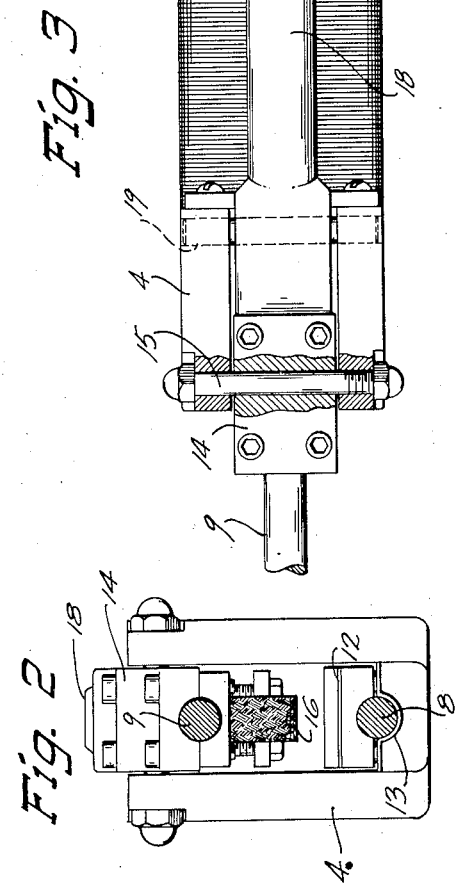
INVENTOR.
Allen C. Mulder
BY
Andrus e Sceales
Attorneys.

May 11, 1948.  A. C. MULDER  2,441,438
PORTABLE MANUAL ELECTRIC SPOT WELDER
Filed March 16, 1948  2 Sheets-Sheet 2
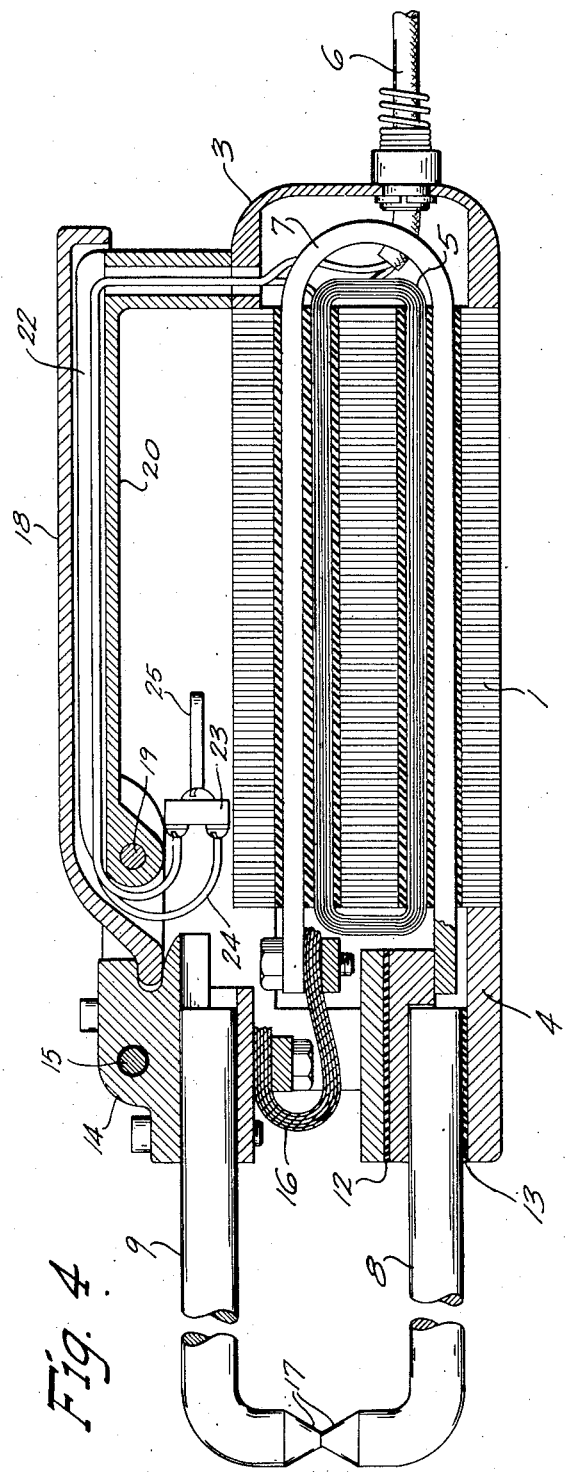
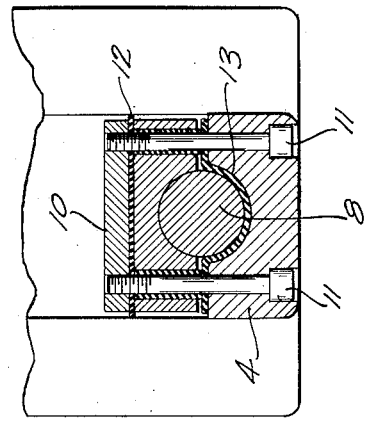
INVENTOR.
Allen C. Mulder
BY Andrus & Sceales
Attorneys.

Patented May 11, 1948

2,441,438

UNITED STATES PATENT OFFICE 2,441,438

PORTABLE MANUAL ELECTRIC SPOT WELDER

Allen C. Mulder, Appleton, Wis., assignor to Miller Electric Manufacturing Co., Appleton, Wis., a corporation of Wisconsin Application March 16, 1948, Serial No. 15,243

7 Claims. (Cl. 219—4)

This invention relates to a portable manual electric spot welder.

One of the principal objects of the invention is to increase the power and efficiency of such a spot welder and reduce its weight and cost.

Another object of the invention is to provide a fully portable manual spot welder that is entirely self contained and which is readily operated and easy to manipulate for welding in a large variety of places.

Another object is to provide a more sturdy compact spot welder that is of long life and less subject to maintenance costs.

Another object is to arrange the operating handle and switch and to construct the transformer in relation thereto in such a manner that a very handy and well appearing spot welder is provided.

Another object is to protect the operating handle of the spot welder against damage.

Another object is to completely enclose the electrical circuit with the exception of the tongs, and to thereby increase the safety of the unit.

Other objects and advantages of the invention will appear hereinafter.

The invention is illustrated in the accompanying drawing in which:

Figure 1 is a side elevation of the spot welder with parts broken away and sectioned;

Fig. 2 is a front end elevation;

Fig. 3 is a top plan view with parts broken away and sectioned;

Fig. 4 is a longitudinal central section taken on Fig. 3; and

Fig. 5 is a detail transverse section showing the manner of insulating the fixed tong from the frame.

The spot welder illustrated has a long substantially rectangular body made up of a plurality of laminations 1 of soft iron or other suitable magnetic material constituting the core for a transformer.

The laminations 1 are secured rigidly together by means of a bolt 2 disposed longitudinally through the laminated core at each corner thereof where the flux is relatively low and which bolts serve to secure the opposite end caps 3 and 4 to the core.

The end caps 3 and 4 are constructed hollow to receive the corresponding end loops of the primary coil 5. Suitable lead wires 6 extend into the rear end cap 3 through a hole therein to supply current to the primary coil 5 from a source of alternating electric current.

The primary coil 5 is made up of a reasonably large number of turns depending upon the voltage of the source. In the commercial structure about seventy-two turns are employed in the primary 5 when the lead wires 6 are connected to a 110 volt source.

The primary coil 5 and also the single secondary copper turn 7 lie in a pair of spaced longitudinal openings in the core laminations 1 formed as complemental grooves in separate halves of each lamination.

The front end cap 4 is open longitudinally for receiving and holding the spot welding electrodes or tongs 8 and 9 extending forwardly therefrom.

The lower fixed tong 8 is clamped to the lower terminal of the secondary turn 7 by means of a clamp plate 10 on top thereof and bolts or screws 11 extending upwardly from countersunk holes in the bottom of cap 4 and threaded into plate 10.

A layer of insulation material 12 is disposed between the clamp plate 10 and the terminal of turn 7, and a similar layer 13 of insulation material is disposed between the tong 8 and cap 4 to insulate the fixed tong 8 from the body of the welder.

The movable tong 9 is secured to a bracket 14 pivoted in the upper side of cap 4 by means of a transverse pin 15. Tong 9 is connected to the upper terminal of secondary turn 7 by means of a U-shaped flexible lead 16 which provides for pivotal movement of the tong without interruption of the welding current.

The outer ends of tongs 8 and 9 are bent toward each other and shaped to provide substantially conical spot welding tips 17 which face each other and are adapted to be pressed toward each other against suitable work pieces disposed therebetween.

For this purpose, the upper tong 9 is moved toward and away from fixed tong 8 by pivoting of bracket 14 in cap 4.

A manually operable lever 18 is pivoted on transverse pin 19 extending parallel to pin 15 and to the rear of the latter. The forward short end of lever 18 interlocks with the rear end of bracket 14 and serves to raise the latter for moving the outer end of tong 9 downwardly toward fixed tong 8, and vice versa.

The rear end of lever 18 is of channel shape facing downwardly over a fixed handle 20 extending parallel to and spaced upwardly from the upper side of the body of the welder.

Handle 20 is of upwardly facing channel shape secured at its forward end to cap 4 by means of pin 19 and to the top of rear cap 3 by means of a bolted flange 21.

The channel groove 22 of handle 20 constitutes a passage for receiving one of the lead wires 6 which passes upwardly from cap 3 through groove 22 to cap 4 where it is connected to one terminal of a switch 23. The other terminal of switch 23 connects to a return wire 24 passing rearwardly along channel groove 22 to cap 3 and then to primary coil 5.

The switch 23 has a rearwardly extending lever 25 beneath handle 20 for ready control of the welding current during operation of the welder.

The lever 18 covers groove 22 along the top of the handle and serves to protect the wires therein from injury.

The welder described is simple to operate and has a number of structural features of considerable advantage commercially. The simplicity of construction provides for light weight and ease of manipulation. The provision of a transformer closely coupled to the welding tongs eliminates the former inefficiencies resulting from separate floor transformers and long secondary leads.

The handy switch and means of connecting the lead wire thereto, and the general shape and location of the handle make for ease of manipulation and carrying of the welder. The simple manual leverage construction for operating the tongs is superior to former generally complicated operating mechanism and provides simple parts of easy and less costly manufacture.

The invention may have various embodiments within the scope of the accompanying claims.

I claim:

1. A manually operated portable electric spot welder comprising a body made up of a plurality of laminations forming the core of a transformer with hollow end caps bolted together therethrough at outer corners of low flux concentration, a pair of spot welding tongs carried by one of said end caps, a primary coil disposed in said core and a secondary turn adjacent said primary coil to provide a transformer, connections through one of said end caps between the terminals of the secondary turn and the corresponding tongs to supply welding current to the latter, one of said tongs being pivotally secured to the end cap near one side thereof to pivot toward and away from the other tong, a fixed handle extending parallel to the side of said body containing said tong pivot and secured to both end caps and centrally spaced from the body, and an operating lever overlapping said handle and pivoted to the end cap which carries said pivotal tong, said lever being connected to said pivotal tong to operate the latter when manually pressed toward said handle.

2. A manually operated portable electric spot welder comprising a body made up of a plurality of substantially square laminations, each made in two complemental halves with two slots in the meeting edges thereof, a transformer primary coil and secondary turn in the longitudinal openings provided by said slots, a pair of end caps bolted together through said laminations at the four corners thereof to secure the halves together and the entire assembly in a rigid compact unit, said end cap enclosing the end of said coil to protect the same, and a pair of welding tongs carried by one of said end caps and connected to the terminals of said secondary through said end cap, one of said tongs being pivotally mounted on said end cap for movement toward and away from the other tong.

3. A manually operated portable electric spot welder comprising a transformer having a core and end caps, a pair of welding tongs carried by one of said end caps and connected therethrough to the secondary of the transformer, and a handle extending along one side of said core in spaced relation thereto and secured to said end caps.

4. A manually operated portable electric spot welder comprising a transformer having a core and end caps, a pair of welding tongs carried by one of said end caps and connected therethrough to the secondary of the transformer, a handle extending along one side of said core in spaced relation thereto and secured to said end caps, one of said tongs being pivotally mounted to the end cap adjacent the end of said handle, and a lever overlying the handle and pivotally mounted to interconnect with said tong and operate the same.

5. A manually operated portable electric spot welder comprising a transformer having a core and end caps, a pair of welding tongs carried by one of said end caps and connected therethrough to the secondary of the transformer, a handle extending along one side of said core in spaced relation thereto and secured to said end caps, and a tong operating pivotally mounted lever overlying said handle, said lever being of channel shape for receiving the handle therein as the lever is moved toward the handle in operating the tongs.

6. A manually operated portable electric spot welder comprising a transformer having a core and end caps, a pair of welding tongs carried by one of said end caps and connected therethrough to the secondary of the transformer, a handle extending along one side of said core in spaced relation thereto and secured to said end caps, a tong operating pivotally mounted lever overlying said handle, said lever being of channel shape for receiving the handle therein as the lever is moved toward the handle in operating the tongs, lead wires entering through the end cap opposite said tongs for supplying current to said transformer, a switch in the other end cap at the end of the inside of the handle, and a wire connection from the lead wires and transformer to said switch passing through a groove in said handle beneath said lever and protected by the latter.

7. A manually operated portable electric spot welder comprising a transformer having a core and end caps, a pair of welding tongs carried by one of said end caps and connected therethrough to the secondary of the transformer, one of said tongs being pivoted to said end cap and having a flexible lead connection to the secondary terminal, and the other of said tongs being clamped to the other secondary terminal and to the end cap, and insulation between said clamped tong and the end cap holding the same.

ALLEN C. MULDER.

REFERENCES CITED

The following references are of record in the file of this patent:

UNITED STATES PATENTS

| Number | Name | Date |
|---|---|---|
| 1,086,042 | Gravell | Feb. 3, 1914 |
| 1,986,512 | Meadowcraft | Jan. 1, 1935 |
| 2,236,162 | Von Henke | Mar. 25, 1941 |

FOREIGN PATENTS

| Number | Country | Date |
|---|---|---|
| 62,649 | Denmark | Sept. 4, 1944 |